(12) United States Patent  (10) Patent No.: US 12,234,420 B2
Dolan et al.  (45) Date of Patent: Feb. 25, 2025

(54) SYSTEMS AND PROCESSES FOR HEAVY HYDROCARBON REMOVAL

(71) Applicant: BASF CORPORATION, Florham Park, NJ (US)

(72) Inventors: William B. Dolan, Iselin, NJ (US); Mark Tomczak, Iselin, NJ (US)

(73) Assignee: BASF Corporation, Florham Park, NJ (US)

(*) Notice: Subject to any disclaimer, the term of this patent is extended or adjusted under 35 U.S.C. 154(b) by 178 days.

(21) Appl. No.: 17/776,818

(22) PCT Filed: Nov. 12, 2020

(86) PCT No.: PCT/US2020/060172
§ 371 (c)(1),
(2) Date: May 13, 2022

(87) PCT Pub. No.: WO2021/101782
PCT Pub. Date: May 27, 2021

(65) Prior Publication Data
US 2022/0403273 A1 Dec. 22, 2022

Related U.S. Application Data

(60) Provisional application No. 62/937,421, filed on Nov. 19, 2019.

(51) Int. Cl.
C10L 3/10 (2006.01)
B01D 53/04 (2006.01)
(Continued)

(52) U.S. Cl.
CPC .......... *C10L 3/101* (2013.01); *B01D 53/0462* (2013.01); *B01D 53/047* (2013.01); *B01D 2253/104* (2013.01); *B01D 2253/108* (2013.01); *B01D 2253/116* (2013.01); *B01D 2253/306* (2013.01); *B01D 2256/245* (2013.01);
(Continued)

(58) Field of Classification Search
CPC ........ C10L 3/101; C10L 3/12; C10L 2290/46; C10L 2290/542; C10L 2290/562; B01D 53/0462; B01D 53/047; B01D 2253/104; B01D 2253/108; B01D 2253/116; B01D 2253/306; B01D 2256/245; B01D 2257/7022; B01D 2253/106; B01D 2258/018
See application file for complete search history.

(56) References Cited

U.S. PATENT DOCUMENTS

2013/0186133 A1* 7/2013 Ploeger ...................... F25J 3/08
62/636
2013/0192299 A1* 8/2013 Dolan ....................... C10G 5/02
62/636

FOREIGN PATENT DOCUMENTS

WO 2015/112198 A1 7/2015

OTHER PUBLICATIONS

International Search Report and Written Opinion of International Application No. PCT/US2020/060172 mailed Feb. 11, 2021, 9 pgs.

* cited by examiner

*Primary Examiner* — Ali Z Fadhel
(74) *Attorney, Agent, or Firm* — Lowenstein Sandler LLP

(57) ABSTRACT

Disclosed herein are processes and systems for removing heavy C5+ hydrocarbon components from a natural gas feed gas by subjecting the natural gas feed gas stream to an adsorber. The adsorber in the processes and systems
(Continued)

described herein operating at a pressure that may be associated with improved adsorption capacity and longer breakthrough time.

20 Claims, 3 Drawing Sheets

(51) Int. Cl.
*B01D 53/047* (2006.01)
*C10L 3/12* (2006.01)
(52) U.S. Cl.
CPC ........ *B01D 2257/7022* (2013.01); *C10L 3/12* (2013.01); *C10L 2290/46* (2013.01); *C10L 2290/542* (2013.01)

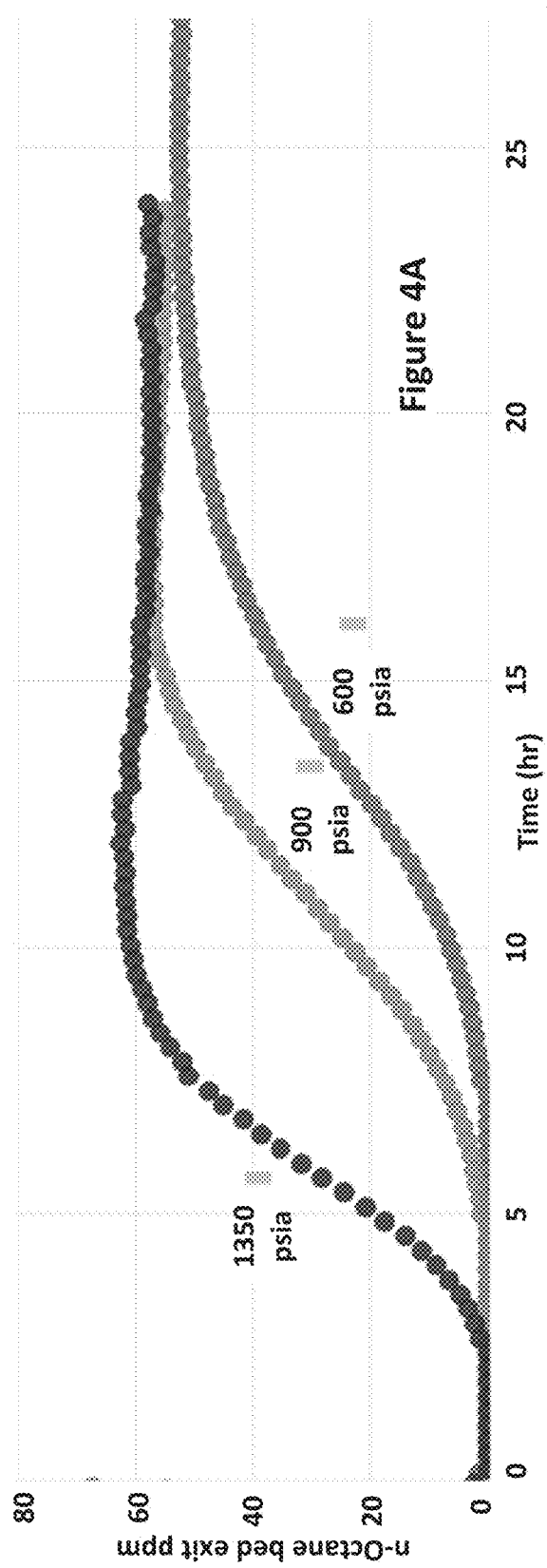
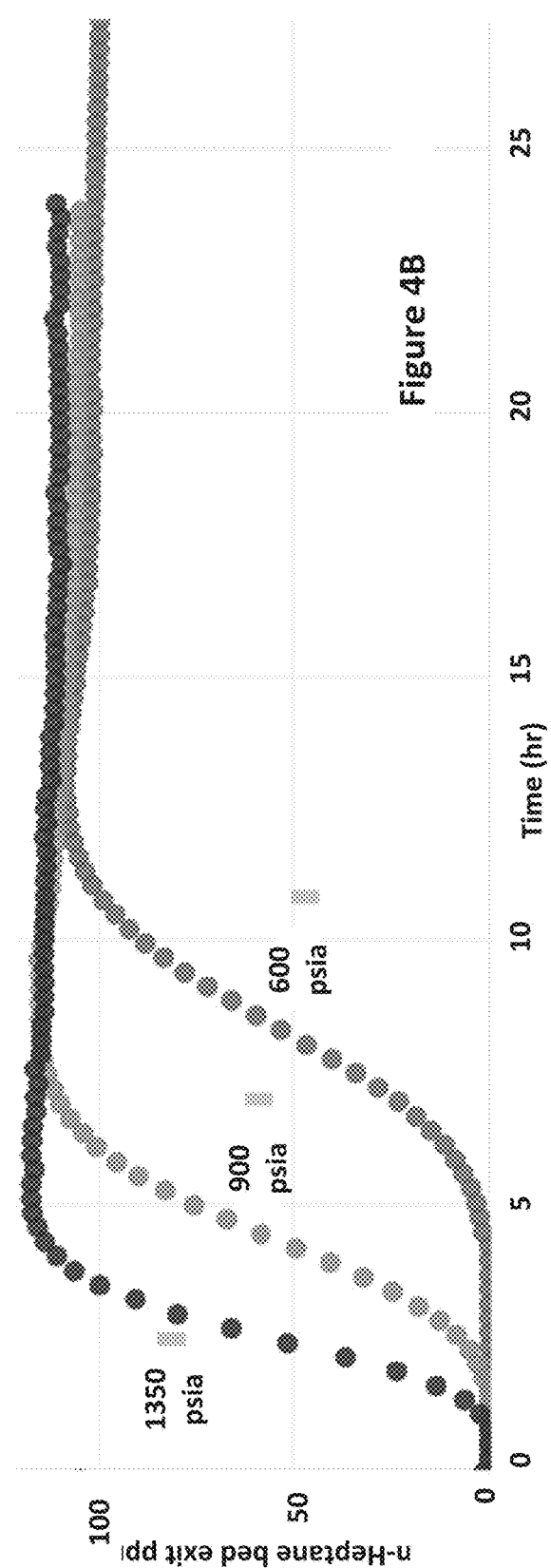
Figure 4A
Figure 4B

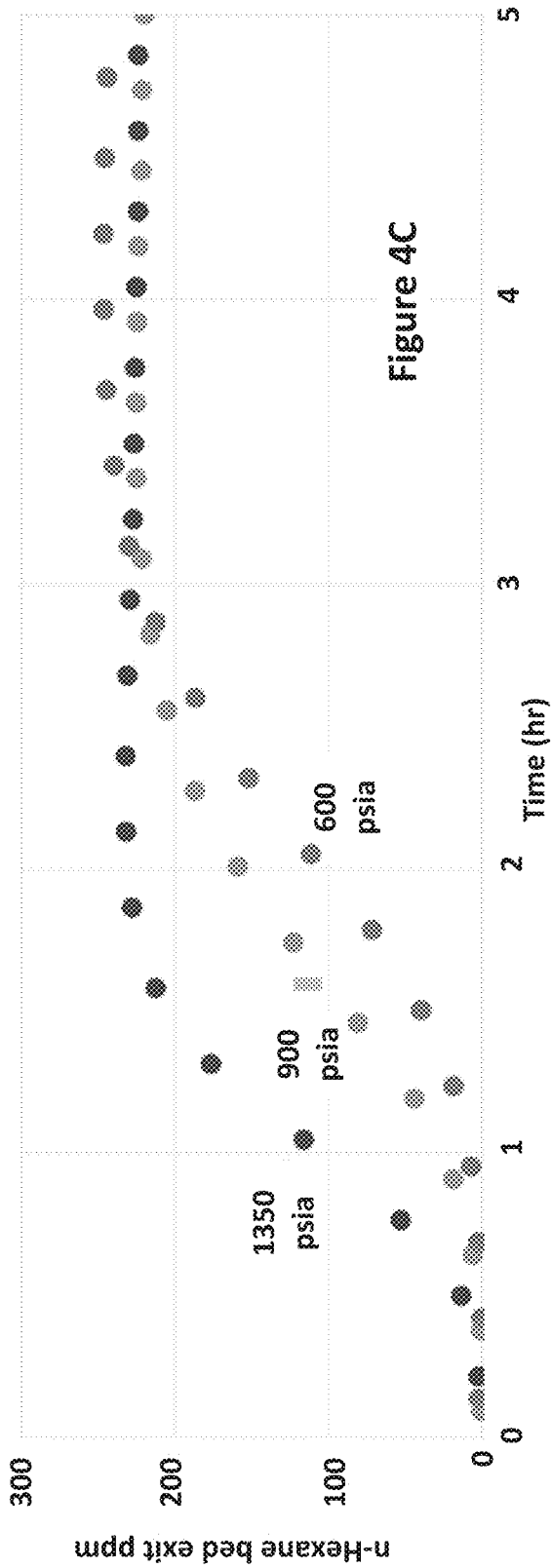
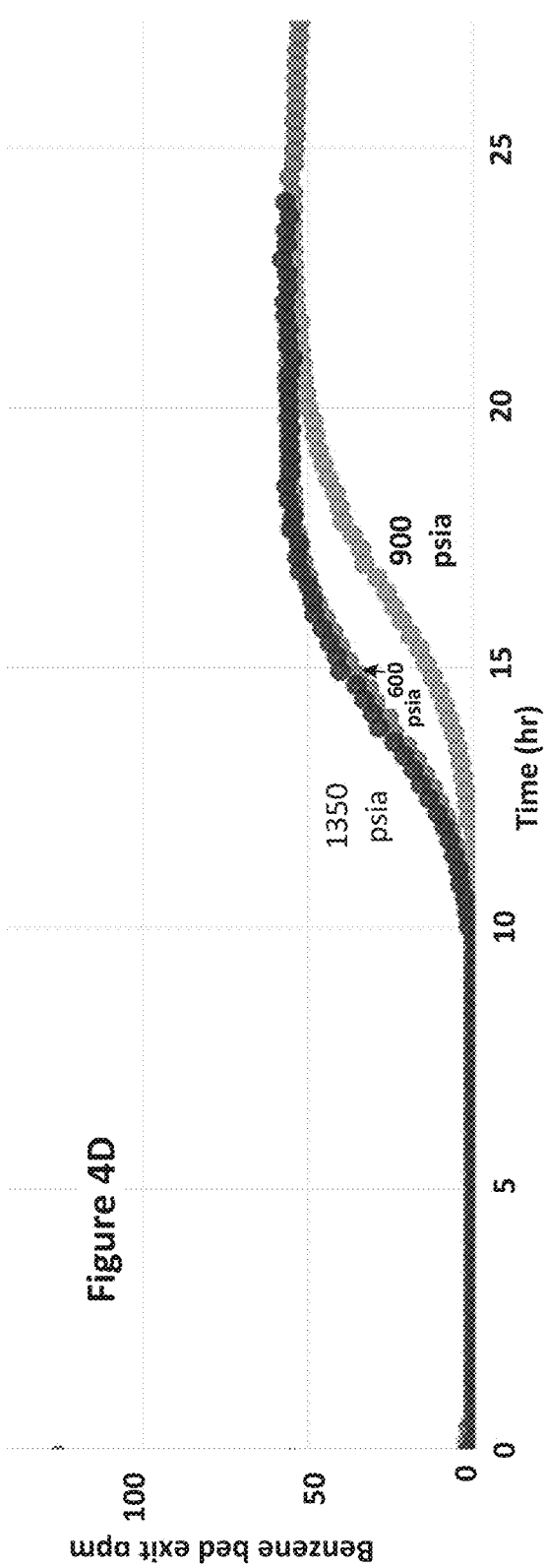

SYSTEMS AND PROCESSES FOR HEAVY HYDROCARBON REMOVAL

RELATED APPLICATIONS

The present application is a national stage entry under 35 U.S.C. § 371 of International Patent Application No. PCT/US2020/060172, filed on Nov. 12, 2020, which claims priority to U.S. Provisional Patent Application No. 62/937,421, filed on Nov. 19, 2019, the disclosures of which are hereby incorporated by reference herein in their entireties.

TECHNICAL FIELD

The present disclosure relates to a process and a system for removing C5+ hydrocarbons from a natural gas feed gas.

BACKGROUND

The term "natural gas" is applied to gas produced from underground accumulations of widely varying composition. The main constituent of natural gas is methane (C1). Apart from methane, natural gas generally includes other hydrocarbons, nitrogen, carbon dioxide, water and sometimes hydrogen sulfide. Hydrocarbon constituents include ethane (C2), propane (C3), butane (C4), pentane (C5), hexane (C6), heptane (C7), octane (C8) etc. Hydrocarbons having 5 or more carbon atoms are referred to as C5+. Hydrocarbons having 2 or more carbon atoms are referred to as C2+. Hydrocarbons having 3 or more carbon atoms are referred to as C3+.

Lighter constituents, C1 up to and including C4, are in the gaseous phase at atmospheric temperature and pressure. Heavier constituents, C5+, are in the gaseous phase at elevated temperatures during production from the subsurface and in liquid phase when the gas mixture is cooled. These heavier constituents are advantageously removed when liquefying the lighter constituents in order to prevent them from freezing out.

Removal of other constituents, such as, water, carbon dioxide, hydrogen sulfide, and hydrocarbons, from natural gas streams is also important to prevent problems that can occur during their processing.

SUMMARY

In some embodiments, the present disclosure may be directed to a method of removing C5+ hydrocarbons from a natural gas feed gas (FG) and sending to a natural gas liquid (NGL) recovery or liquefied natural gas (LNG) facility or a $CO_2$ removal processing unit or a pipeline. The method may comprise routing the FG at a pressure $P_{adsorber}$ over an adsorber to adsorb C5+ hydrocarbons and provide a heavy hydrocarbon depleted natural gas (HHCDNG) stream at pressure $P_{adsorber}$. Pressure $P_{adsorber}$ may range from about 300 psia to about 1200 psia. The adsorber may comprise a hydrocarbon-selective adsorbent. The method may further comprise routing the HHCDNG stream through one or more compressors to provide a HHCDNG at pressure P3, wherein $P3>P_{adsorber}$.

In some embodiments, the present disclosure may be directed to a method of removing C5+ hydrocarbons from a natural gas FG and sending to a natural gas liquid (NGL) recovery or liquefied natural gas (LNG) facility or a $CO_2$ removal processing unit or a pipeline. The method may comprise routing the FG at a pressure P1 through one or more compressors to provide a FG at a pressure $P_{adsorber}$. The method may further comprise routing the FG at pressure $P_{adsorber}$ through an adsorber to adsorb C5+ hydrocarbons and provide HHCDNG stream at pressure $P_{adsorber}$. The adsorber may be a hydrocarbon-selective adsorbent. The method may further comprise routing the HHCDNG stream through one or more compressors to provide a HHCDNG at pressure P3, wherein P3 may be greater than P1 (P3>P1) and/or P3 may be greater than $P_{adsorber}$ ($P3>P_{adsorber}$) and/or $P_{adsorber}$ may be greater than P1 ($P_{adsorber}>P1$). $P_{adsorber}$ may range from about 300 psia to about 1200 psia.

In some embodiments, the present disclosure may be directed to a system for removing C5+ hydrocarbons. The system may comprise an adsorber comprising a hydrocarbon-selective adsorbent. The system may be configured to route a FG at a pressure $P_{adsorber}$ over the adsorber to adsorb C5+ hydrocarbon and provide HHCDNG stream at pressure $P_{adsorber}$. Pressure $P_{adsorber}$ may range from about 300 psia to about 1200 psia. The system may further comprise one or more compressors positioned after the adsorber configured to receive HHCDNG at pressure $P_{adsorber}$ and compress the HHCDNG to pressure P3, wherein P3 may be greater than $P_{adsorber}$ ($P3>P_{adsorber}$).

The term "C5+ components" refers to hydrocarbons having five or more carbons. For example a non-exhaustive list of C5+ components includes one or more of pentane, hexane, benzene, heptane, octane, nonane, decane, toluene, ethylbenzene, methyl-mercaptan, ethyl-mercaptan, xylene, etc.

BRIEF DESCRIPTION OF THE DRAWINGS

The above and other features of the present disclosure, their nature, and various advantages will become more apparent upon consideration of the following detailed description, taken in conjunction with the accompanying drawings, in which:

FIG. 4A depicts breakthrough curves for octane at 1350 psia, 900 psia, and 600 psia.

FIG. 4B depicts breakthrough curves for heptane at 1350 psia, 900 psia, and 600 psia.

FIG. 4C depicts breakthrough curves for hexane at 1350 psia, 900 psia, and 600 psia.

FIG. 4D depicts breakthrough curves for benzene at 1350 psia, 900 psia, and 600 psia.

DETAILED DESCRIPTION

Figure 1:
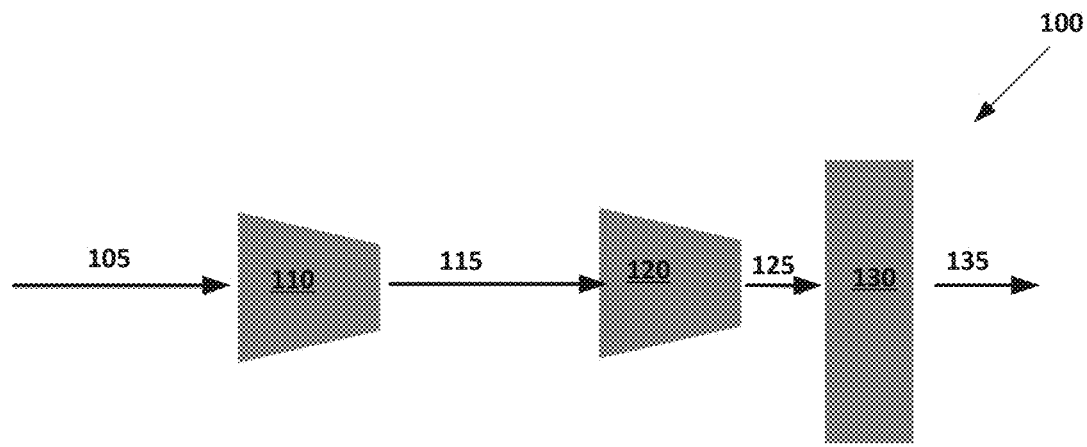
FIG. 1 illustrates a simplified diagram of a process for removing C5+ hydrocarbons from a natural gas feed gas according to conventional heavy hydrocarbon removal systems.

The present disclosure provides methods and systems for removing heavy hydrocarbons (e.g., C5+ hydrocarbons) from a natural gas feed gas (FG) stream with greater process efficiency. In typical adsorption processes, increase in pressure may be expected to lead to increase in the amount of material adsorbed on an adsorbent's surface. However, certain adsorption processes conducted at higher pressures unexpectedly exhibit a decrease in the amount of material adsorbed on an adsorbent's surface. The methods and systems described herein may comprise an adsorbent configured to operate at a pressure range that may be associated with increased adsorption capacity and/or longer breakthrough time of C5+ hydrocarbons.

The various embodiments are now described with reference to the following figures and examples. Before describing several exemplary embodiments, it is to be understood that the present disclosure is not limited to the details of construction or process steps set forth in the following description. Other embodiments may be practiced or carried out in various ways in accordance with the principles described. The lines in FIGS. 1, 2, and 3 indicate that the elements are in fluid communication. The location of an arrow in the Figures does not necessarily represent the desired location of entry of a gas stream into a particular unit.

The natural gas may be collected from one or more wells by a field gathering system into a combined stream. Streams from various wells may be subjected to one or more processing units aimed at reaching certain stream properties (e.g., water content, hydrogen sulfide content, carbon dioxide content, pressure, and the like). For instance, it may be advantageous to adjust the pressure of streams from various wells such that all streams have a common pressure prior to being combined into the combined stream. If a stream from one well has a pressure that is higher than the targeted common pressure, a throttle may be introduced to reduce the pressure in the stream having the higher pressure. If a stream from a certain well has a pressure that is lower than the targeted common pressure, a compressor may be introduced to increase the pressure in the stream having the lower pressure. If a stream has a water and/or carbon dioxide and/or hydrogen sulfide content that is higher than a target level for the combined stream, an adsorber that is water-selective and/or carbon dioxide-selective and/or hydrogen sulfide-selective, respectively, may be introduced to reduce their content until the target level is achieved.

Ultimately the processed streams from various wells may get combined in a single combined stream, referred to herein as the "natural gas feed gas stream." The natural gas feed gas stream may enter an adsorption system to remove heavy hydrocarbons and may subsequently enter an NGL extraction facility to produce a natural gas liquefied product that may be referred to herein as "NGL." In certain embodiments, the field gathering system may be separated from the adsorption system described herein and from the NGL extraction facility. In some embodiments, the field gathering system may encompass an area located at a distance of up to about 0.1 miles, up to about 0.2 miles, up to about 0.3 miles, up to about 0.4 miles, up to about 0.5 miles, up to about 1 mile, or up to about 2 miles from the adsorption system described herein and/or from an NGL extraction facility.

The composition of the natural gas feed gas (FG) stream to enter the adsorption system can vary. For instance, the FG stream may contain ≤ about 1000 ppm, ≤ about 600 ppm, ≤ about 500 ppm, ≤ about 400 ppm, ≤ about 300 ppm, ≤ about 200 ppm, ≤ about 100 ppm, ≤about 50 ppm, ≤ about 25 ppm, or ≤ about 5 ppm water, on a molar basis based on the FG stream. For example, the FG may contain from about 0.5 ppm, about 1 ppm, about 3 ppm, about 5 ppm, about 10 ppm, about 15 ppm, about 20 ppm, about 25 ppm, about 30 ppm, about 40 ppm, about 50 ppm, about 60 ppm, about 70 ppm, about 80 ppm, about 90 ppm, about 100 ppm or about 110 ppm to about 120 ppm, about 130 ppm, about 135 ppm, about 140 ppm about 150 ppm, about 160 ppm, about 165 ppm, about 200 ppm, about 300 ppm, about 400 ppm, about 500 ppm, about 600 ppm, or about 1000 ppm water, on a molar basis based on the FG stream.

In certain embodiments, the FG stream entering the adsorption system may be 100% water saturated or less, about 90% water saturated or less, about 80% water saturated or less, about 70% water saturated or less, about 60% water saturated or less, about 50% water saturated or less, about 40% water saturated or less, about 30% water saturated or less, about 20% water saturated or less, about 10% water saturated or less, about 5% water saturated or less, about 3% water saturated or less, about 1% water saturated or less, about 0.5% water saturated or less, or about 0.1% water saturated or less.

The FG stream entering the adsorption system may contain ≤ about 50%, ≤ about 40%, ≤ about 30%, ≤ about 20%, ≤ about 10%, ≤ about 5%, ≤ about 4%, ≤ about 3%, ≤ about 2%, or ≤ about 1% carbon dioxide, on a molar basis based on the FG stream. For example, the FG stream may contain from about 0.5%, about 0.8%, about 0.9%, about 1.0%, about 1.1%, about 1.2%, about 1.3%, about 1.4% or about 1.5% to about 1.6%, about 1.7%, about 1.8%, about 1.9%, about 2.0%, about 2.1%, about 2.2%, about 2.5%, about 3.0%, about 3.5%, about 4.0%, about 5.0%, about 10%, about 20%, about 30%, about 40%, or about 50% carbon dioxide, on a molar basis based on the FG stream.

For instance, some embodiments of the instant disclosure may incorporate the adsorption system described herein into a $CO_2$ removal process.

One exemplary $CO_2$ removal process may encompass amine removal of $CO_2$ from natural gas where an amine based absorbent may be used to remove $CO_2$ from natural gas by flowing the absorbent through a column typically counter current to the natural gas feed flow. In such a process, the $CO_2$ may dissolve into the absorbent and gas containing a reduced amount of $CO_2$ may leave the top of the column. Subsequently, the absorbent may be routed to a regeneration column where it may be heated to release the absorbed $CO_2$. After the $CO_2$ removal from the absorbent, the absorbent may be cooled and sent back to the column containing natural gas to be used again for $CO_2$ absorption.

Another exemplary $CO_2$ removal process may encompass membrane based process for $CO_2$ removal where $CO_2$ may be passed across a membrane that preferentially permeates $CO_2$ over natural gas. The natural gas once passed over the membrane may be reduced in $CO_2$ content relative to the feed natural gas.

Such processes may be susceptible to heavy hydrocarbons in their feeds and may benefit from the adsorption systems described herein for removing the heavy hydrocarbons prior to being subjected to $CO_2$ removal processes. The heavy hydrocarbon adsorption systems described herein may be advantageous to an amine based $CO_2$ absorption process because the presence of heavy hydrocarbons can cause foaming in the amine towers, resulting in poor performance. The heavy hydrocarbon adsorption systems described herein may be advantageous to a membrane $CO_2$ removal process because the presence of heavy hydrocarbons may cause a degradation in membrane performance either in productivity (amount of gas that can be processed to meet a given $CO_2$ specification) or recovery of the methane (flow methane from unit/flow methane to unit).

The FG stream may contain less than about 5%, less than about 1%, less than about 0.1%, or less than about 0.001% hydrogen sulfide, on a molar basis based on the FG stream.

Alternatively, the FG stream may be outside of the specifications regarding acceptable levels of water and/or carbon dioxide and/or hydrogen sulfide. For example, the FG stream may exceed the acceptable levels of water and/or carbon dioxide and/or hydrogen sulfide by up to about 10%, for example up to about 1%, about 2%, about 3%, about 4%, about 5%, about 6%, about 7%, about 8% or about 9%.

As mentioned, the natural gas feed gas stream that enters the adsorption systems and/or NGL extraction facility and/or LNG facility and/or $CO_2$ removal processing unit may be within specifications for sales gas regarding acceptable levels of water and/or carbon dioxide and/or hydrogen sulfide. Otherwise, an additional purification step may be performed prior to the gas entering the adsorption system and/or NGL extraction facility and/or LNG facility and/or $CO_2$ removal processing unit.

"Natural gas liquid (NGL)," as used herein, may refer to a stream containing C2+ hydrocarbons (such as C1-C4 hydrocarbons, including ethane, methane, propane, butane, and isobutane).

"Liquefied natural gas (LNG)," as used herein, may refer a natural gas that has been cooled to a liquid state for shipping and storage to make it possible to transport natural gas to places where pipelines do not reach. LNG is predominantly methane.

The FG stream entering the plant may contain from about 87%, about 88%, about 89% or about 90% to about 91%, about 92%, about 93%, about 94%, about 95% or about 96% methane, on a molar basis based on the FG stream. The concentration of C2, C3, and C4 hydrocarbons in the FG stream may be in the range of from about 0.4%, about 0.5%, about 0.6%, about 0.7%, about 0.8%, about 0.9%, or about 1% to about 1.2%, about 1.4%, about 1.6%, about 1.8%, about 2.0%, about 2.2%, about 2.4%, about 2.6%, about 2.8%, about 3.0%, about 3.2%, about 3.4%, about 3.6%, about 3.8%, about 4.0%, about 5.0%, about 6.0%, about 7.0%, about 8.0%, about 9.0%, about 10.0%, about 11.0%, or about 12.0%, on a molar basis based on the FG stream.

The concentration of C5+ hydrocarbons in the FG stream may be in the range of from about 0.01%, about 0.1%, about 0.2%, about 0.3%, about 0.4%, about 0.5%, about 0.6%, about 0.7%, about 0.8%, about 0.9%, or about 1% to about 1.2%, about 1.4%, about 1.6%, about 1.8%, about 2.0%, about 2.2%, about 2.4%, about 2.6%, about 2.8%, about 3.0%, about 3.2%, about 3.4%, about 3.6%, about 3.8%, about 4.0%, about 4.2%, about 4.4%, about 4.6%, about 4.8%, or about 5.0%, on a molar basis based on the FG stream.

The FG stream, such as described above and shown in FIGS. 1, 2, and 3 as reference numerals 105, 205, and 305, respectively, may be directed to a heavy hydrocarbon removal system, also referred to herein as "adsorption system." FIG. 1 depicts an example of a conventional heavy hydrocarbon removal system 100. In system 100, FG stream 105 may be directed to one or more compressors 110 and 120 that may together form a compressor train. FG stream exiting from compressor 110 is shown in FIG. 1 as stream 115. The pressure of stream 115 may be greater than the pressure of stream 105. Stream 115 may enter compressor 120, thereby generating stream 125 having a pressure greater than the pressure of streams 115 and 105. Stream 125 may enter adsorber 130 to undergo heavy hydrocarbon selective adsorption to remove heavy hydrocarbons from the FG and generate a heavy hydrocarbon depleted natural gas (HHCDNG) stream 135.

Existing heavy hydrocarbon removal processes have the adsorption stage in adsorber 130 occur at pressures ranging from about 400 psia to about 1400 psia. The pressure of the adsorption stage may be the same as the pressure of stream 135 and of the HHCDNG and of the final sale gas excluding any pressure drop that occurs due to flow across the adsorbent bed.

In some embodiments, systems described herein position the adsorber in the middle of a compressor train (FIG. 2) or before a compressor train (FIG. 3) as opposed to after the compressor train and as opposed to the adsorber being the last processing unit (intended to operate at the highest pressure in the process), as done in existing processes (FIG. 1). Although the compressor unit in the Figures is shown in a simplified manner, the skilled artisan would understand that the term "compressor" also encompasses any associated cooling equipment subsequent to the compressor to cool the stream that exits the compressor. Further, "compressor," as used herein may encompass any equipment that raises the pressure of a stream above the inlet pressure to the equipment and any associated gas cooling equipment. As such, a stage of compression may also represent a compressor in some embodiments. For example, a stage of compression may be one cylinder of a multiple cylinder reciprocating compressor with associated coolers. In some embodiments, the adsorption system described herein may be placed after the cooler of any given stage of compression or compressor. Alternatively, the adsorption system described herein may be placed in front of the compressor.

Figure 2:
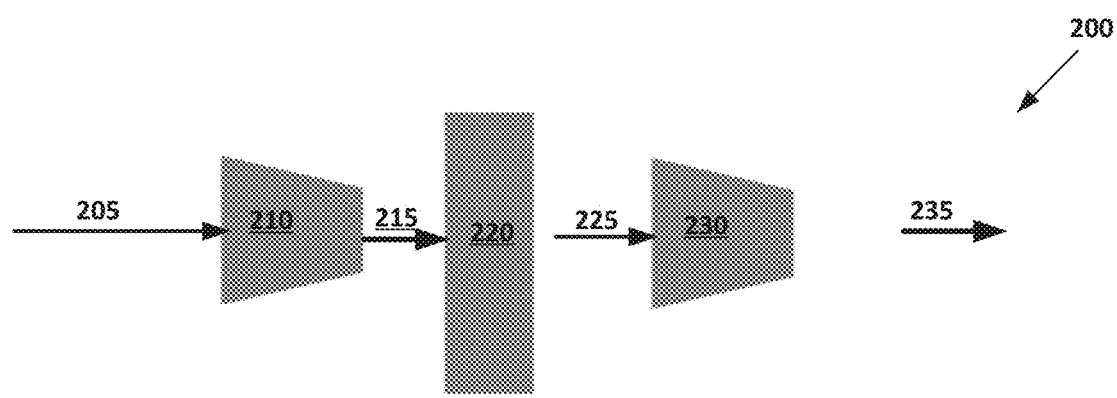
FIG. 2 illustrates a simplified diagram of a process for removing C5+ hydrocarbons from a natural gas feed gas according to an embodiment.
Figure 3:
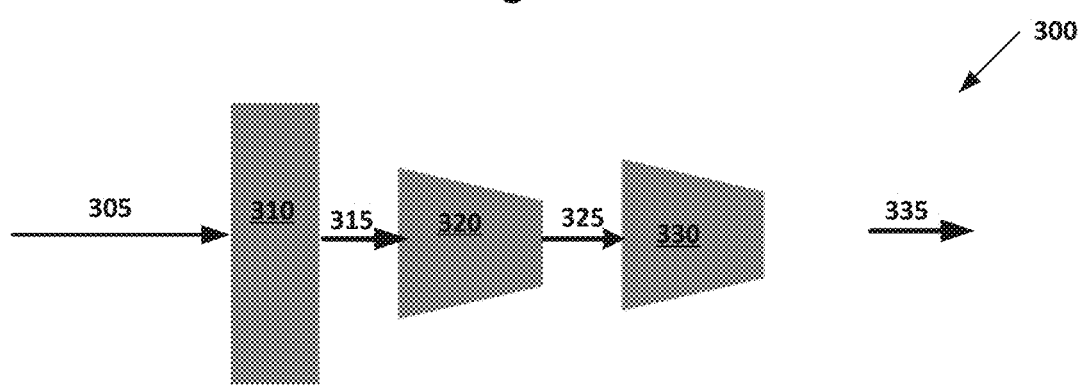
FIG. 3 illustrates a simplified diagram of a process for removing C5+ hydrocarbons from a natural gas feed gas according to an embodiment.

Positioning the adsorber as shown in FIGS. 2 and 3 aims at improving the efficiency of heavy-hydrocarbon removal at the adsorption stage. As shown in FIGS. 4A-4C, above a certain adsorber bed pressure, the adsorption capacity of the adsorber bed decreases with increasing adsorber bed pressure. Correspondingly, above a certain adsorber bed pressure, the breakthrough time of a heavy hydrocarbon (C5+) component through the adsorber bed decreases with increasing adsorber bed pressure. Accordingly, it may be advantageous to operate the heavy hydrocarbon-selective adsorber at a pressure range that is associated with higher adsorption capacity and longer breakthrough time. In some embodiments, the pressure range associated with higher adsorption capacity (of C5+ hydrocarbons) may range from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia. As shown in FIG. 4D, for certain C5+ hydrocarbons there may be an optimal adsorber bed pressure associated with improved adsorption capacity and with a longer breakthrough time. For instance, for benzene, the optimal adsorber bed pressure may range from about 600 psia and 1350 psia, e.g., 900 psia.

FIG. 2 depicts an example of a heavy hydrocarbon removal system 200 according to an embodiment. In system 200, FG stream 205 may be initially directed to one or more compressors, such as compressor 210. FG stream exiting from a stage of compression or compressor 210 is shown in FIG. 2 as stream 215. The pressure of stream 215 may be greater than the pressure of stream 205, yet smaller than the pressure of a compressed HHCDNG stream 235 or a final sale gas stream. Stream 215 may enter adsorber 220 to undergo heavy hydrocarbon selective adsorption to remove heavy hydrocarbons from the FG and generate a heavy hydrocarbon depleted natural gas (HHCDNG) stream 225. Stream 225 may have a similar pressure as that of stream 215 excluding any pressure drop that occurs due to flow across the adsorbent bed. HHCDNG stream 225 may enter one or more compressors or stages of compression, such as compressor 230 to generate a compressed HHCDNG stream 235. Stream 235 may have a pressure that is greater than the pressure of streams 205, 215, and 225.

The system depicted in FIG. 2 may be utilized in some embodiments in a method of removing C5+ hydrocarbons from a natural gas feed gas. The method may comprise routing the FG 205 at a pressure P1 through one or more compressors, such as 210, to provide a FG stream 215 at a pressure $P_{adsorber}$. The method may further comprise routing the FG stream 215 at pressure $P_{adsorber}$ through an adsorber 220, to adsorb C5+ hydrocarbons and provide a heavy hydrocarbon depleted natural gas (HHCDNG) stream 225 at pressure $P_{adsorber}$. The adsorber may comprise a hydrocarbon-selective adsorbent. $P_{adsorber}$ may be greater than P1. For instance, P1 may range from about 50 psia, about 100 psia, or about 150 psia to about 200 psia, about 250 psia, or about 300 psia. $P_{adsorber}$ may range from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia.

In certain embodiments, the method may further comprise routing the HHCDNG stream 225 through one or more compressors, such as 230, to provide a compressed HHCDNG stream 235 at pressure P3. P3 may be greater than both $P_{adsorber}$ and P1. For instance, P3 may range from about 600 psia, about 800 psia, about 900 psia, or about 1000 psia to about 1200 psia, about 1600 psia, about 1800 psia, or about 2000 psia.

FIG. 3 depicts an example of a heavy hydrocarbon removal system 300 according to an embodiment. In system 300, FG stream 305 may be initially directed to an adsorbent 310 to undergo heavy hydrocarbon selective adsorption to remove heavy hydrocarbons from the FG and generate a heavy hydrocarbon depleted natural gas (HHCDNG) stream 315. Stream 315 may have a similar pressure as that of stream 305. HHCDNG stream 315 may enter one or more compressors or stages of compression, such as compressors 320 and 330 to generate the final stream 335. Stream 335 may have a pressure that is greater than the pressure of streams 305, 315, and 325.

The system depicted in FIG. 3 may be utilized in some embodiments in a method of removing C5+ hydrocarbons from a natural gas feed gas. The method may comprise routing the FG 305 at a pressure $P_{adsorber}$ over an adsorber 310 to adsorb C5+ hydrocarbons and provide a heavy hydrocarbon depleted natural gas (HHCDNG) stream at pressure $P_{adsorber}$. For instance, pressure $P_{adsorber}$ may range from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia. Adsorber 310 may comprises a hydrocarbon-selective adsorbent. In certain embodiments, the method may further comprise routing the HHCDNG stream 315 through one or more compressors or stages of compression, such as 320 and 325, to provide a compressed HHCDNG stream 335 at pressure P3. P3 may be greater than $P_{adsorber}$. For instance, P3 may be the pressure of the sale gas and may range from about 600 psia, about 800 psia, about 900 psia, or about 1000 psia to about 1200 psia, about 1600 psia, about 1800 psia, or about 2000 psia.

Routing a stream (e.g., the FG stream) over the adsorbent bed places the stream in contact with the hydrocarbon-selective adsorbent and serves to remove C5+ hydrocarbons. The adsorber unit may be one or more of a pressure swing adsorber (PSA) or a thermal swing adsorber (TSA) or combination thereof. In an embodiment, the adsorber is a TSA.

Suitable hydrocarbon-selective adsorbents may be solids having a microscopic structure. The internal BET surface area of such adsorbents is for example from about 100 m$^2$/g, 300 m$^2$/g, or about 500 m$^2$/g to about 1500 m$^2$/g, 1700 m$^2$/g, or about 2000 m$^2$/g. The nature of the internal surface of the hydrocarbon-selective adsorbent in an adsorbent bed is such that heavier hydrocarbons (i.e., C5+ hydrocarbons) are adsorbed. Suitable adsorbent materials include one or more of silica, silica gel, alumina, potassium permanganate, silica-alumina, molecular sieves, zeolites, metal organic frameworks (MOFs), activated carbon, polymer, resins, clays, or sorbead. In some embodiments, the sorbent may have optimal parameters, such as BET surface area, pore volume, bulk density, mass, volume, and diameter that will increase the sorbent's affinity to C5+ components. In certain embodiments, the sorbent may be activated. The activation may include subjecting the sorbent to various conditions including, but not limited to, certain temperature, vacuum, an inert gas flow, or any combination thereof, for sufficient time to activate the sorbent material.

The adsorber may be programmed into cycle times, wherein the adsorption pressure and/or temperature is maintained for a predetermined duration optimal for efficient adsorption of the C5+ components (yet inefficient for the adsorption of undesired components). A non-limiting exemplary adsorption cycle time may range from about 20 minutes to about 60 hours, from about 40 minutes to about 40 hours, or from about 120 minute to about 24 hours. After the adsorption step the bed can then be heated with a portion of the HHCDNG stream (e.g., about 10 wt % to about 30 wt % of the HHCDNG stream, based on weight of the bed). The HHCDNG stream may be heated to a temperature of about 270° C. followed by cooling the bed using a portion of the HHCDNG stream, and regenerating the bed for a period of about 0.5 hours to about 40 hours.

The temperature of the FG may be for instance from about −20° C., about −10° C., 0° C., about 10° C., about 20° C., about 30° C. or about 40° C. to about 50° C., about 60° C., about 70° C., about 80° C., or about 90° C. The adsorption temperature in an adsorber may range from about 5° C. to about 50° C. The desorption temperature in an adsorber may range from about 180° C. to about 350° C.

The HHCDNG stream exiting from an adsorber may have about 10%, about 20%, about 30%, about 40%, about 50%, about 60%, about 70%, about 80%, about 85%, about 90%, about 95%, about 98%, of the C5+ components removed, as calculated on a molar basis of the C5+ components in the hydrocarbon stream that was fed to the adsorption system. In some embodiments, the HHCDNG exiting from the adsorber may have from about 10% to about 99% of the C5+ components from the FG fed to the adsorption system removed.

The HHCDNG stream exiting from an adsorber may have about 10%, about 20%, about 30%, about 40%, about 50%, about 60%, about 70%, about 80%, about 85%, about 90%, about 95%, about 98%, of the C6+ components removed, as calculated on a molar basis of the C6+ components in the hydrocarbon stream that was fed to the adsorption system. In some embodiments, the HHCDNG exiting from the adsorber may have from about 10% to about 99% of the C6+ components from the FG fed to the adsorption system removed.

The HHCDNG stream exiting from an adsorber may have about 10%, about 20%, about 30%, about 40%, about 50%, about 60%, about 70%, about 80%, about 85%, about 90%, about 95%, about 98%, of the C7+ components removed, as calculated on a molar basis of the C7+ components in the hydrocarbon stream that was fed to the adsorption system. In some embodiments, the HHCDNG exiting from the adsorber may have from about 10% to about 99% of the C7+ components from the FG fed to the adsorption system removed.

The HHCDNG stream exiting from an adsorber may have about 10%, about 20%, about 30%, about 40%, about 50%, about 60%, about 70%, about 80%, about 85%, about 90%, about 95%, about 98%, of the C8+ components removed, as calculated on a molar basis of the C8+ components in the hydrocarbon stream that was fed to the adsorption system. In some embodiments, the HHCDNG exiting from the adsorber may have from about 10% to about 99% of the C8+ components from the FG fed to the adsorption system removed.

In some embodiments, the HHCDNG exiting the adsorption system may comprise less than about 98%, less than about 95%, less than about 90%, less than about 80%, less than about 70%, less than about 60%, less than about 50%, less than about 40%, less than about 30%, less than about 20%, less than about 10%, less than about 8%, less than about 5%, less than about 3%, less than about 2%, or less than about 1% C5+ and/or C6+ and/or C7+ and/or C8+ components, calculated on a molar basis based on the HHCDNG stream.

The methods described herein may be implemented in systems for removing C5+ hydrocarbons and/or C6+ hydrocarbons and/or C7+ hydrocarbons and/or C8+ hydrocarbons. In certain embodiments, the systems described herein comprise an adsorber comprising a heavy hydrocarbon-selective adsorbent. The system may be configured to route a FG as described above over an adsorber (e.g., one or more of a pressure swing adsorber and/or a thermal swing adsorber) to adsorb C5+ hydrocarbons and to provide a HHCDNG stream at pressure $P_{adsorber}$. $P_{adsorber}$ may range from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia.

In certain embodiments, any of the systems described above may further comprise one or more compressors or one or more stages of compression positioned before the adsorber. The one or more compressors or stages of compression may be configured to route the FG such that the pressure of the FG entering the adsorber is $P_{adsorber}$ as described above. Any of the systems described above may further comprise one or more compressors positioned after the adsorber configured to receive HHCDNG at pressure $P_{adsorber}$ as described above and compress the HHCDNG to a pressure P3. P3 may be the final pressure of the HHCDNG stream (and might also be the pressure of a final sale gas) and may range from about 600 psia, about 800 psia, about 900 psia, or about 1000 psia to about 1200 psia, about 1600 psia, about 1800 psia, or about 2000 psia.

The term "configured" as used in the description and claims is intended to be an open-ended term as are the terms "comprising" or "containing". The term "configured" is not meant to exclude other possible elements. The term "configured" may be equivalent to "adapted".

The systems shown in the Figures and described herein should not be construed as limited only to the processing units that are depicted. Other processing units may also be part of systems according to certain embodiments. Examples of other processing units include, without limitations, one or more heat exchangers, additional compressors, expanders, turbo-expanders, Joule-Thompson valves, columns, reboilers, condensers, reflux drums, temperature controllers, coolers, heaters, separators, knock-out pots, valves and the like.

The methods and systems described herein with respect to their application in removing heavy hydrocarbons to form NGL should not be construed as limited to the natural gas industry. The skilled artisan would understand that the methods and systems described herein may be utilized in other industrial applications. Exemplary suitable industrial applications may be ones where it is advantageous to remove contaminants from gaseous streams exhibiting non-ideal gas behaviors (such as decreasing adsorption capacity with increasing average bed pressure).

Thus, some embodiments of the instant disclosure may be generally directed to a method of removing certain constituents from a feed gas. The method may comprise routing the feed gas at a pressure $P_{adsorber}$ over an adsorber to adsorb the constituent and provide a constituent depleted feed gas stream at pressure $P_{adsorber}$ ranging from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia, wherein the adsorber comprises a constituent-selective adsorbent.

The adsorption systems described herein may generate natural gas streams that are depleted from heavy hydrocarbons for various industrial applications. Some of the industrial applications may include generating natural gas streams depleted of heavy hydrocarbon for: natural gas liquids (NGL) recovery, liquefied natural gas (LNG) facilities, processing natural gas from underground storage and into a pipeline, for $CO_2$ removal processes (e.g., amine or membrane based $CO_2$ removal processes), and the like.

In certain embodiments, the instant disclosure may be generally directed to a system for removing a constituent. The system may comprise an adsorber comprising a constituent-selective adsorbent. The system being configured to route a feed gas at a pressure $P_{adsorber}$ over the adsorber to adsorb the constituent and provide a constituent depleted feed gas stream at pressure $P_{adsorber}$ ranging from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia.

EXAMPLES

The following examples are set forth to assist in understanding the embodiments described herein and should not be construed as specifically limiting the embodiments described and claimed herein. Such variations, including the substitution of all equivalents now known or later developed, which would be within the purview of those skilled in the art, and changes in formulation or minor changes in experimental design, are to be considered to fall within the scope of the embodiments incorporated herein.

Example 1—Adsorption Capacity of Hexane, Heptane, and Octane as a Function of Average Adsorbent Bed Pressure A bed of approximately 120 grams of adsorbent was fed with a gas containing 210 ppm hexane, 110 ppm heptane, 55 ppm octane, 55 ppm Benzene, and the balance was methane. The bed had a 0.75" inner diameter (ID). The flow rate to the bed was 15.5 slpm. The temperature of the feed was 25° C. and the bed was located in a temperature controlled room at 25° C. Breakthrough test were completed at 600 psia, 900 psia, and 1350 psia. Before each test the bed was regenerated for 6 hours with $N_2$ at 17 slpm, pressure=1.2 atm, at 270° C.

by preheating the feed and supplying heat to the exterior of the bed. Temperature probes on the exterior of the bed were controlled to 270° C. The bed was cooled with dry $N_2$ flow after heating FIGS. 4A, 4B, and 4C depict breakthrough plots for octane, heptane, and hexane, respectively. The results for the 3 different pressure levels are shown in each plot. As can be seen in all plots the time for breakthrough is increasing as the pressure is decreasing indicating that an adsorption bed's capacity or time on stream is increasing as the pressure drops. FIG. 4D shows an optimal adsorption capacity (and longest breakthrough time) for benzene when operating at an adsorption pressure of 900 psia.

FIGS. 4A-4C all show decreasing adsorption capacity with increasing bed pressure as evidence by the shorter breakthrough times. Accordingly, the pressure range associated with higher adsorption capacity may range from about 300 psia to about 1200 psia, from about 350 psia to about 1050 psia, from about 400 psia to about 900 psia, from about 300 psia to about 700 psia, from about 350 psia to about 650 psia, or from about 400 psia to about 600 psia. FIG. 4D illustrates that for Benzene a higher capacity for at 900 psia then either 650 psia or 1350 psia. Depending on operating adsorption temperature it is anticipated that the best pressure for operation can change.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "some embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more implementations.

Although the embodiments disclosed herein have been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

In addition, the term "or" is intended to mean an inclusive "or" rather than an exclusive "or." When the term "about" or "approximately" is used herein, this is intended to mean that the nominal value presented is precise within ±10%.

What is claimed is:

1. A method of removing C5+ hydrocarbons from a natural gas feed gas (FG) stream and sending to a natural gas liquids (NGL) recovery or liquefied natural gas (LNG) facility or a $CO_2$ removal processing unit and/or a pipeline, the method comprising:
   routing the FG at a pressure $P_{adsorber}$ over an adsorber to adsorb C5+ hydrocarbon and provide a heavy hydrocarbon depleted natural gas (HHCDNG) stream at pressure $P_{adsorber}$ ranging from about 300 psia to about 1200 psia, wherein the adsorber comprises a hydrocarbon-selective adsorbent; and
   routing the HHCDNG stream through one or more compressors to provide a HHCDNG at pressure P3, wherein P3>$P_{adsorber}$, and wherein the adsorbent is configured to operate at the pressure $P_{adsorber}$ associated with increased adsorption capacity and/or longer breakthrough time of the C5+ hydrocarbons.

2. A method of removing C5+ hydrocarbons from a natural gas feed gas (FG) stream and sending to a natural gas liquids (NGL) recovery or liquefied natural gas (LNG) facility or a $CO_2$ removal processing unit or a pipeline, the method comprising:
   routing the FG at a pressure P1 through one or more compressors to provide a FG stream at a pressure $P_{adsorber}$;
   routing the FG stream at pressure $P_{adsorber}$ through an adsorber, to adsorb C5+ hydrocarbon and provide a heavy hydrocarbon depleted natural gas (HHCDNG) stream at pressure $P_{adsorber}$, the adsorber comprising a hydrocarbon-selective adsorbent; and
   routing the HHCDNG stream through one or more compressors to provide a HHCDNG at pressure P3, wherein P3>P1 and/or P3>$P_{adsorber}$ and/or $P_{adsorber}$>P1, wherein $P_{adsorber}$ ranges from about 300 psia to about 1200 psia, and wherein the adsorbent is configured to operate at the pressure $P_{adsorber}$ associated with increased adsorption capacity and/or longer breakthrough time of the C5+ hydrocarbons.

3. The method of claim 2, wherein P3 ranges from about 600 psi to about 2000 psia, from about 800 psia to about 1800 psia, or from about 1000 psia to about 1600 psia.

4. The method of claim 2, wherein the adsorber is one or more of a pressure swing adsorber (PSA) or a thermal swing adsorber (TSA).

5. The method of claim 2, wherein the adsorber is a thermal swing adsorber (TSA).

6. The method of claim 2, wherein $P_{adsorber}$ ranges from about 350 psia to about 1050 psia, from about 400 psia to about 900 psia, from about 300 psia to about 700 psia, from about 350 psia to about 650 psia, or from about 400 psia to about 600 psia.

7. The method of claim 2, wherein the FG stream is about 90% water saturated or less.

8. The method of claim 2, wherein the FG stream comprises less than about 5%, less than about 4%, less than about 3%, less than about 2%, or less than about 1% carbon dioxide, on a molar basis based on the FG stream.

9. The method of claim 2, wherein the HHCDNG comprises less than about 98%, less than about 95%, less than about 90%, less than about 80%, less than about 70%, less than about 60%, less than about 50%, less than about 40%, less than about 30%, less than about 20%, less than about 10%, less than about 8%, less than about 5%, less than about 3%, less than about 2%, or less than about 1%, C5+ components, calculated on a molar basis based on the HHCDNG stream.

10. The method of claim 2, wherein the hydrocarbon-selective adsorbent has an internal BET surface area from about 100 m$^2$/g to about 2000 m$^2$/g.

11. The method of claim 2, wherein the hydrocarbon-selective adsorbent is one or more of silica, silica gel, alumina, silica-alumina, molecular sieves, zeolites, or sorbead.

12. A system for removing C5+ hydrocarbons, comprising an adsorber comprising a hydrocarbon-selective adsorbent, the system being configured to route a feed gas (FG) stream at a pressure $P_{adsorber}$ over the adsorber to adsorb C5+ hydrocarbon and provide a heavy hydrocarbon depleted natural gas (HHCDNG) stream at pressure $P_{adsorber}$ ranging from about 300 psia to about 1200 psia, the system further comprising one or more compressors positioned after the adsorber configured to receive HHCDNG at pressure $P_{adsorber}$ and compress the HHCDNG to pressure P3, wherein P3>$P_{adsorber}$, and wherein the adsorbent is configured to operate at the pressure $P_{adsorber}$ associated with increased adsorption capacity and/or longer breakthrough time of the C5+ hydrocarbons.

13. The system of claim 12, wherein $P_{adsorber}$ ranges from about 350 psia to about 1050 psia, from about 400 psia to about 900 psia, from about 300 psia to about 700 psia, from about 350 psia to about 650 psia or from about 400 psia to about 600 psia.

14. The system of claim 12, wherein the adsorber is one or more of a pressure swing adsorber (PSA) or a thermal swing adsorber (TSA).

15. The system of claim 12, further comprising one or more compressors positioned before the adsorber configured to compress the FG stream at a pressure P1 such that the pressure of the FG stream existing the one or more compressors positioned before the adsorber and entering the adsorber is $P_{adsorber}$.

16. The system of claim 15, wherein P3>$P_{adsorber}$ and wherein P3 ranges from about 600 psi to about 2000 psia, from about 800 psia to about 1800 psia, or from about 1000 psia to about 1600 psia.

17. The system of claim 12, wherein the FG stream is about 90% water saturated or less.

18. The system of claim 12, wherein the HHCDNG comprises less than about 98%, less than about 95%, less than about 90%, less than about 80%, less than about 70%, less than about 60%, less than about 50%, less than about 40%, less than about 30%, less than about 20%, less than about 10%, less than about 8%, less than about 5%, less than about 3%, less than about 2%, or less than about 1% C5+ components, calculated on a molar basis based on the HHCDNG stream.

19. The system of claim 12, wherein the hydrocarbon-selective adsorbent has an internal BET surface area from about 100 m$^2$/g to about 2000 m$^2$/g, and wherein the hydrocarbon-selective adsorbent is one or more of silica, silica gel, alumina, silica-alumina, molecular sieves, zeolites, or sorbead.

20. The system of claim 12, further comprising one or more of a natural gas liquids (NGL) recovery facility, a liquefied natural gas (LNG) facility, a $CO_2$ removal processing unit, a pipeline for transporting natural gas retrieved from underground storage, positioned after the adsorber.

* * * * *